United States Patent [19]

Zemek et al.

[11] 3,730,041

[45] May 1, 1973

[54] AXIAL LEAD DISPENSER HEAD

[75] Inventors: Albert W. Zemek; Robert H. Holmes; Frank J. Orzelek, all of Binghamton, N.Y.

[73] Assignee: Universal Instruments Corporation, Binghamton, N.Y.

[22] Filed: Nov. 3, 1971

[21] Appl. No.: 195,253

[52] U.S. Cl. ........................83/278, 83/440, 83/449, 83/599, 83/607, 83/925 R

[51] Int. Cl. ..............................................B26d 7/06

[58] Field of Search......................83/278, 440, 441, 83/444, 449, 599, 607, 925 R; 221/30, 71; 29/203 R; 227/93

[56] References Cited

UNITED STATES PATENTS 3,421,284 1/1969 Zemek..............................221/30 X 2,854,054 9/1958 Gross................................221/71 X

*Primary Examiner*—J. M. Meister

*Attorney*—Fedelman, Wolffe, Leitner & Hiney

[57] ABSTRACT

An axial lead component dispensing apparatus which has the capacity to handle components having extremely long axial leads in relation to the longitudinal dimensions of the body of the component. The device incorporates a pair of notched feeder blades which are reciprocal to advance rolls of taped components. The feeder blades and accompanying components are transversely adjustable along a feed shaft from which the feeder blade gets its reciprocal motion and which also powers a cutter shaft to sever the leads below the feeder portion of the apparatus.

7 Claims, 9 Drawing Figures

INVENTORS
ALBERT W. ZEMEK,
ROBERT H. HOLMES & FRANK J. ORZELEK
BY Fidelman, Wolffe & Leitner
ATTORNEYS Patented May 1, 1973 3,730,041

4 Sheets-Sheet 2

AXIAL LEAD DISPENSER HEAD

This invention relates to an apparatus for severing the leads of axial lead components, such as resistors, and presenting them in severed transverse presentation to an insertion apparatus which does not form any part of this invention.

Axial lead components, as used in industry, come from stock with the ends of the leads taped between parallel portions of links of adhesive tape taped to one another. The leads are longer than the insertion requirements so that they may be taped and handled.

Standard techniques encompass feeding the leads on a dispensing mechanism which presents then in a horizontal fashion after the ends which have been taped have been severed from the remaining or body portion of the lead. Such components are used in pantograph type insertion equipment and tape sequencing and numerically controlled insertion equipment. The instant invention contemplates all of these uses and is essentially employed to sever the end portions of the leads and to present the components in a predetermined order.

One of the problems with existing equipment has been their inability to handle varying center distance components, in other words, the length of the axial leads from the components may vary depending on the center distance to be employed in the insertion apparatus itself. Center distance is defined as the distance between the holes in the printed circuit board into which the ends of the leads are bent and pushed and secured. In Europe, in the Common Market, the center distance in numerous applications is a lot larger than the normal center distance used in domestic industry.

Another problem encountered in conventional dispensing devices has been the inability of the device to accurately and continually dispense the components into an insertion apparatus. This lack of positive action has caused the axial lead components to jam in the dispensers, necessitating shut-down of the machine and correction. Also prior devices have not been able to hold the taped axial lead components prior to cutting in a predetermined position to resist jamming and binding of the tapes and the components themselves within the dispensing apparatus.

Accordingly, it is an object of this invention to overcome all of the aforementioned difficulties.

Another object of this invention is revision of an axial lead dispensing head which insures positive holding, severing, and dispensing action of axial lead components.

A further object of this invention is to provide a novel axial lead dispensing apparatus having the ability to handle various length axial lead components. These and other objects of the invention will become apparent when reference is had to the following specification and the drawings in which.

Figure 1:
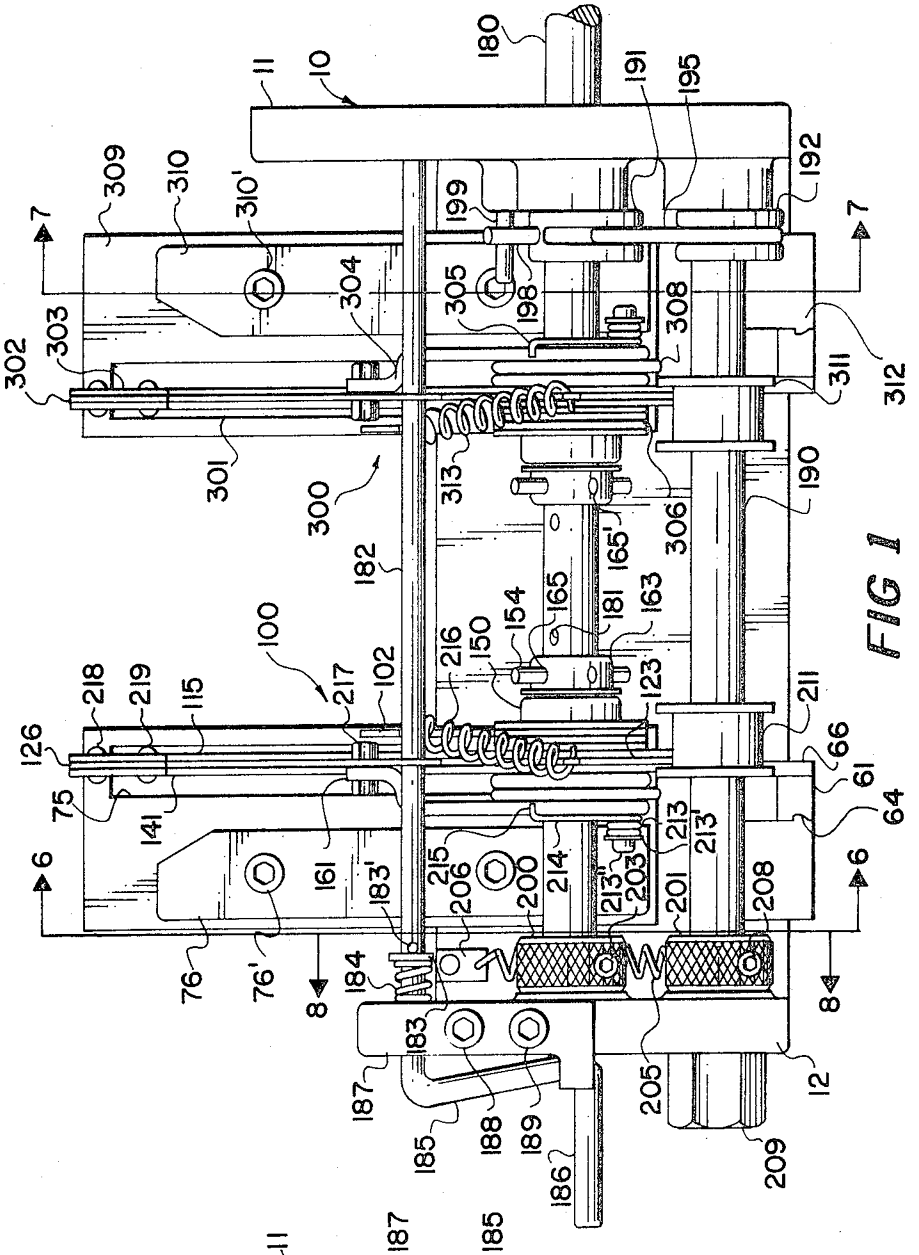
FIG. 1 is a front view of the dispensing head of this invention showing the interrelationship of the various components.
Figure 5:
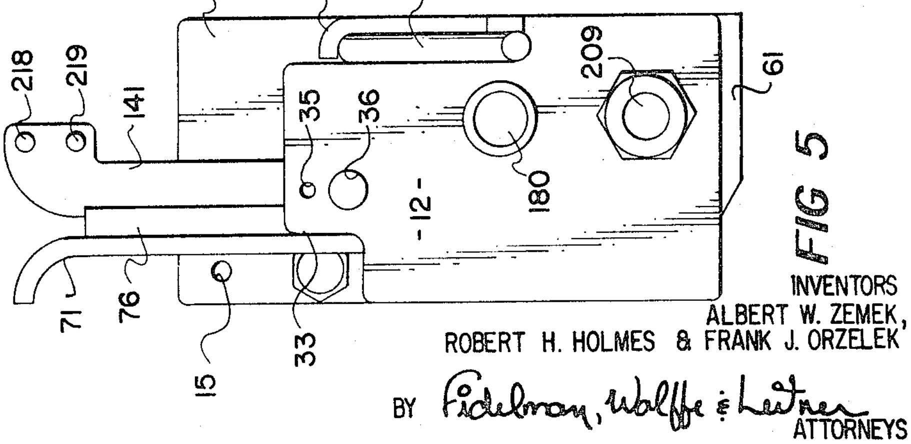
FIG. 5 is an end view of the apparatus as shown in FIG. 1.
Figure 2:
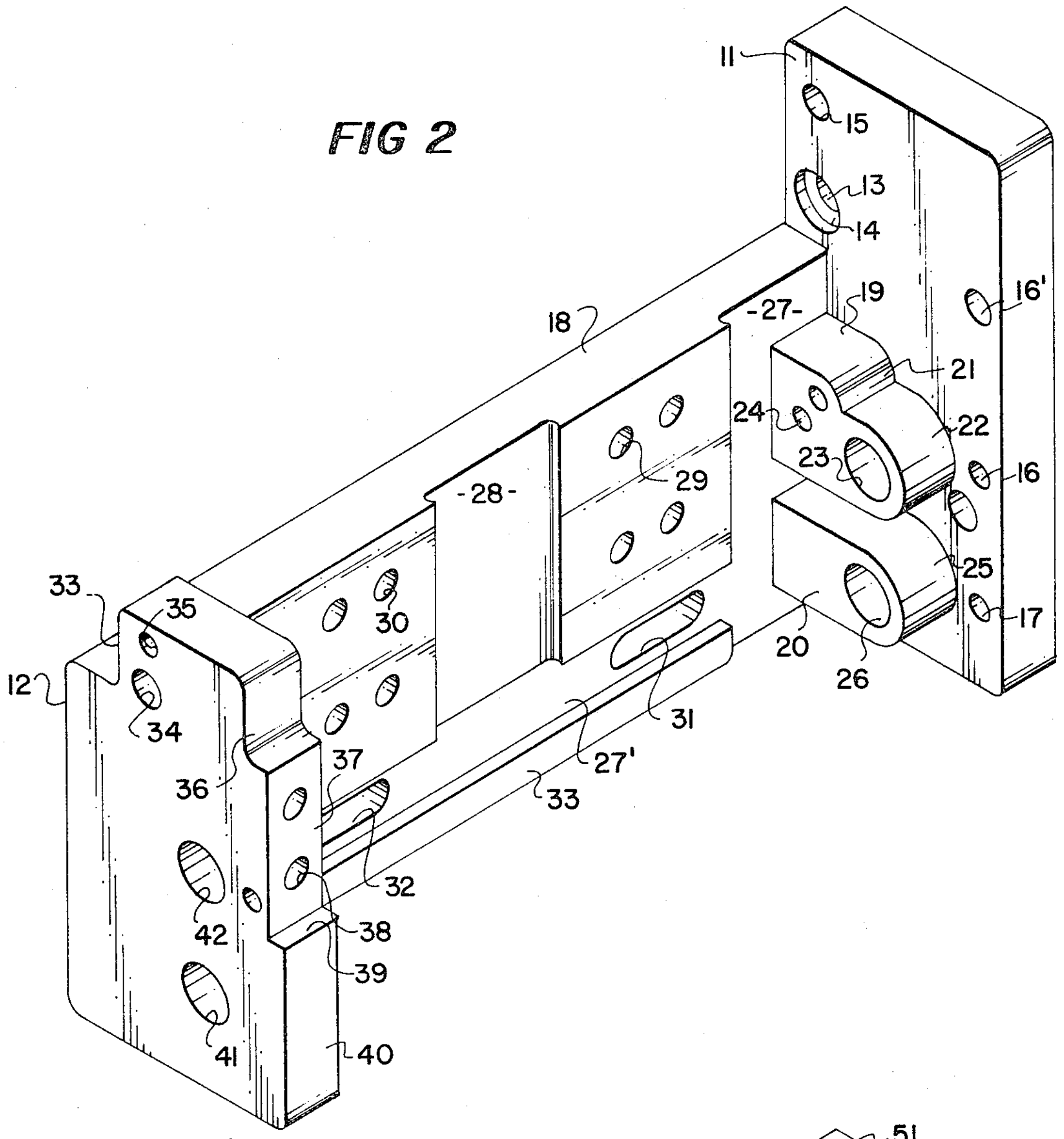
FIG. 2 is a perspective view of the main mounting bracket of the dispensing head.

Referring now to FIG. 1, the dispensing apparatus of the instant invention is shown and is designated by the numeral 10. Referring to the apparatus, it is housed in the central support bracket 11 as shown in FIG. 2. Bracket 11 has an end portion 11 and an end portion 12. Portion 11 has nine holes such as 13 having a counterbore 14 and running holes such as 15, 16, 17 and 16'. The end portions 11 and 12 are connected by the webbed portion 18 and mounted in the angle of the intersection of webbed portion 18 and end portion 11 is a shaft support portion 19 and a cutter shaft support portion 20. The portion 19 is tapered as at 21 and rounded as at 22 and has a central aperture 23 therein for receiving a feed shaft. Holes 24 have three stop members to be described. Portion 20 has a bore 26 therein adapted to receive one end of a cutter shaft.

Webbed portion 18 is relieved as at 27 and 28 to provide raised portions having mounting holes such as 29 and 30. Webbed portion 18 also is slotted as at 31 and 32 and relieved as at 27' to provide a lower ridge portion 33. End portion 12 has a raised portion 33 having bores 34 and 35 therein and is tapered as at 36 on the opposite side. The relieved section on the edge of face 37 is provided with bore 38. The relieved section 37 provides a shoulder 39 between it and the lower edge face 40 of end portion 12. Aligned with floors 23 and 26, respectively, are bores 42 and 41 of end portion 12 which are adapted to receive the feed from cutter shafts respectively.

Figure 3:
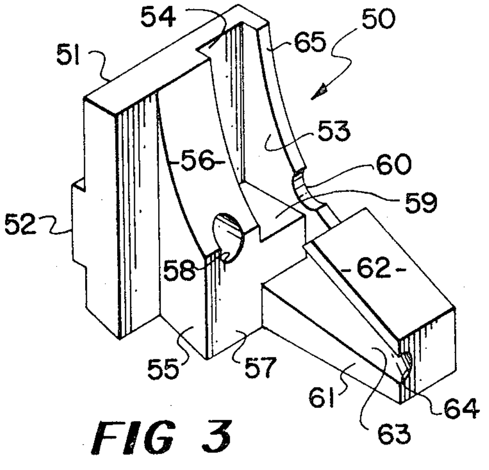
FIG. 3 is a right perspective view of one of the dispensing dies used to guide the severed components to presentation position.
Figure 6:
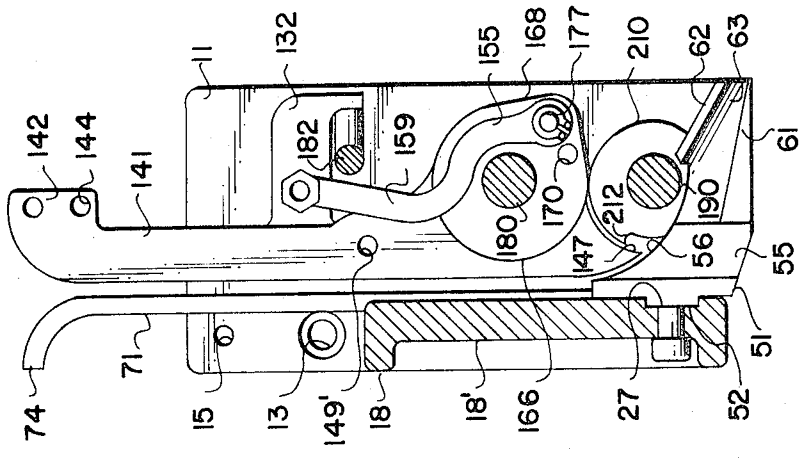
FIG. 6 is a cross section of the apparatus shown in FIG. 1 taken along line 6—6 thereof.

Referring now to FIG. 3, there is shown the left hand dispensing die as viewed in the apparatus of FIG. 1. The die is designated generally as 50 and it is understood that corresponding dies exist such as 312 as is shown in FIG. 1 on the other side of the apparatus and is the mirror image of die 50. The die is in the main body portion 51 which has a projection 52 adapted to be received within relieved portion 27' of webbed portion 18 of the support bracket. This interlocking is illustrated in FIG. 6. The machine screw is adapted to pass in the threaded bore [not shown] within portion 52 and secured to the web 18. As is noted the machine screw passes through slot 32 so that the die 50 may be adjusted laterally along web 18 to accommodate various center distance components.

Figure 4:
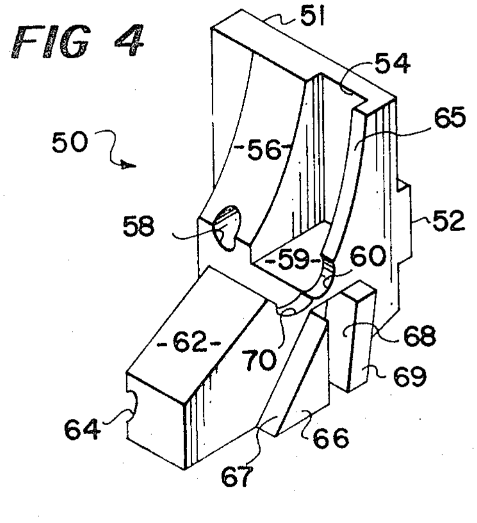
FIG. 4 is a left hand perspective view of the die shown in FIG. 3.

Body portion 51 is relieved as at 54 and has a main portion 55 extending therefrom. Main portion 55 has an end face 57 and a sloped portion 56 which merges with the edge of body portion 51. A bore 58 is located partially on sloped portion 56 and on end face 57 and is the threaded bore referred to earlier. A flange portion 53 extends from body portion 51 and terminates in a guide portion 61. Flange portion 53 is notched as at 60 and can be additionally notched as shown at 70 in FIG. 4. The surface 59 is formed between slope portion 56 and flange portion 53. Guide portion 61 has an upper bevelled face 62 and a tapered conical grooved portion 63 which terminates as at 64 at the end face of portion 61. As shown in FIG. 4, the component guide portions 66 and 69 are located on the outer face of flange portion 53 and are bevelled as at 68 and 67 to provide a slot for the remaining portion of the component lead to be guided down therethrough. The slot 60 is located on a sloped edge 65 in flange section 53. The taped component leads are brought down against sloped portion 65 with the tape passing down in relieved area 54 of body portion 51. Due to the slope of edge 65 the leads of the components are forced outwardly from that until they snap into notch 60. At that point a cutter severs the taped portion of the lead from the main portion thereof; and the remaining portion, which is still attached to the component, passes down to slot 68. The cut or severed portion of the lead, together with the tape, is fed along tapered groove 63 and falls to the side and downward of the machine.

Figure 9:
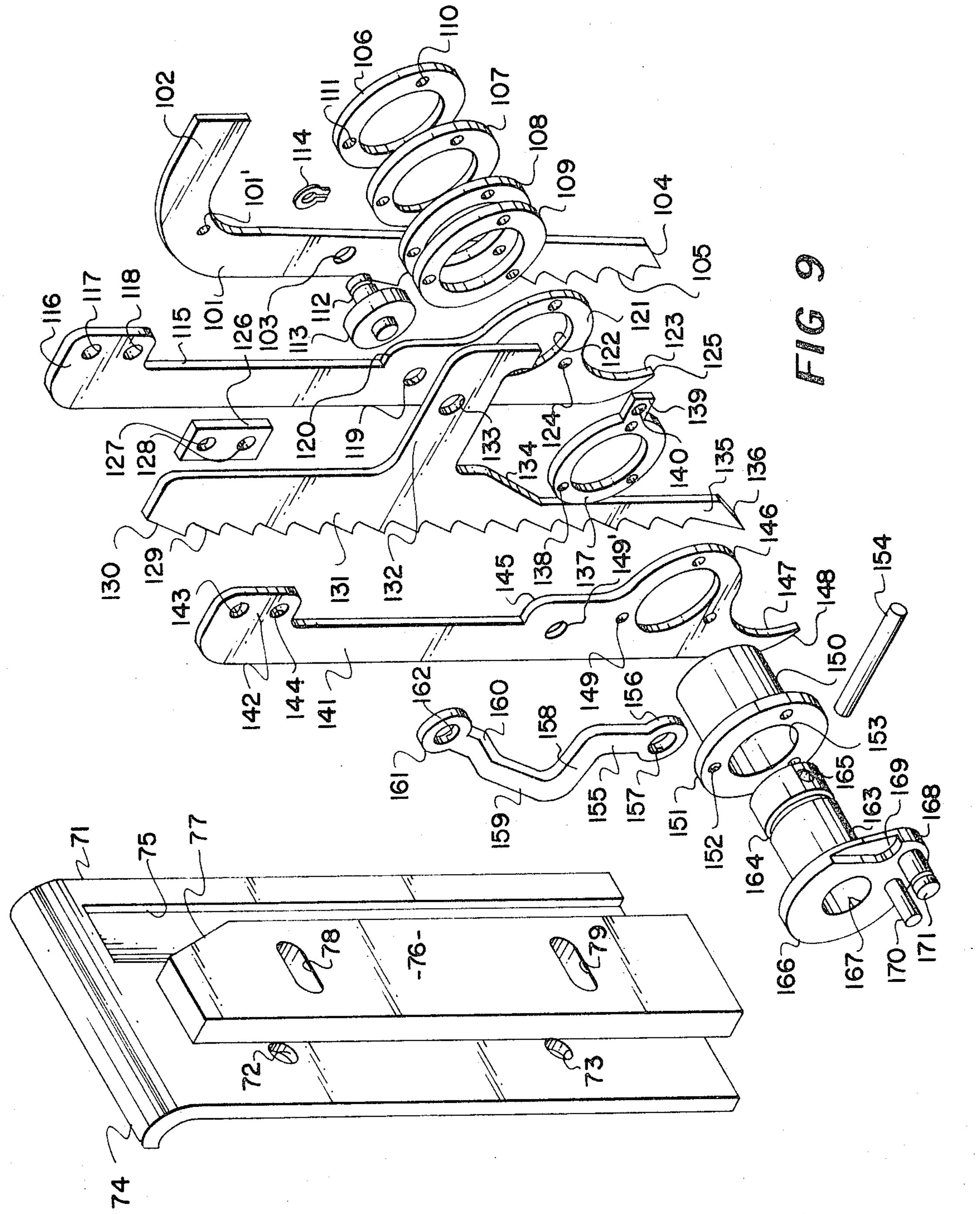
FIG. 9 is an exploded perspective view of one-half of the working components used to advance the taped axial leads on the apparatus shown in FIG. 1.

Referring now to FIG. 9, there is shown the advancement and guide mechanism for the apparatus. The mechanism is designated generally as 100 and it is understood that there are two such mechanisms, while only one will be described. The remaining mechanism is identical to the one shown in FIG. 9 but again, is the mirror image thereof. Adapted to be attached to the raised portion having mounting holes 30 of webbed portion 18 is a rear plate 71 having an upper tapered or bent portion 74 and a groove 75 therein. Mounting holes 72 and 73 are provided therein. The guide member 76 is adapted to be mounted on the face of rear plate 71 and has slots 78 and 79 therein. Slot 79 corresponds with slot 32 of webbed portion 18. The guide 76 may be laterally adjusted together with die 50. The mounting holes 72 and slot 78 are adapted to align with holes such as 30 in webbed portion 18.

Referring now to the feeder portion of the mechanism, from right to left there is shown an advancement dog 101 having an upwardly projecting J-shaped portion 102 and a hole 101 therein. Located about one-third of the way down dog 101 is a post receiving hole 103. The lower rear portion of dog 101 is provided along its edge thereof with scalloped teeth 105 and terminates in lower bevelled portion 104.

A retainer 106 is shown as having securing holes 110 and 111. Having identical aligned securing holes and adapted to be mounted adjacent in an abutting relation with retainer 106 are spacer 107 and further retainers 108 and 109. These are shown in FIG. 9 and are adapted to be mounted on the feed shaft 180 shown in FIG. 1. Hole 103 and dog 101 are adapted to receive a post 112 that has an annular groove therein in which retainer 114 is adapted to be received to lock the post 112 within hole 103 of dog 101. The post has a large annular section 113 which acts as a spacer and the other end of post 112 is adapted to be received within hole 119 of feed guide 115.

Feed guide 115 has an upper enlarged portion 116 having mounting holes 117 and 118 therein. Adjacent post receiving hole 119 has a rounded, enlarged portion 120 terminating in flange portion 121. A bore 122 is located within flange portion 121 and is also adapted to receive feed shaft 180. Mounting holes such as 124 are adapted to be aligned with mounting holes from retainers 108 and 109. The lower portion of feed guide 115 is tapered as at 123 and terminates in point edge 125. A spacer 126 having holes 127 and 128 therein is adapted to space portion 116 of feed guide 115 from portion 142 of feed guide 141. Rivets such as 218 and 219 as shown in FIG. 1 are adapted to pass through passages 117 and 118 of feed guide 115 and pass through holes 127 and 128 of spacer 126 and into holes 143 and 144 of feed guide 141. Feed guide 141 is identical to feed guide 115 and has a hole 149 and enlarged portion 145, flange portion 146 and its accompanying bore therein. It also has holes such as 149 adapted to receive securing means and tapers as at 147 to point edge 148. Adapted to be mounted between the flange portion 146 of the feed guide 141 and flange portion 121 of feed guide 115 is spacer 137 having aligning holes such as 138 and a projecting portion 139 having a passage 140 therein. The bores shown in feed guide 141 and 115 and spacers 137 and 107 and retainers 108, 109, 110 have a diameter substantially equal to the diameter of hub 150 of bushing 151. Bushing 151 has a central bore 153 which is adapted to fittingly receive the hub portion 163 of drive flange 166. Bushing 151 also has alignment holes such as 152 adapted to align with holes such as 149 in feed guide 141 and 111 in retainer 106 to align the various retainers, spacers, and feed guides. Drive flange 166 has a portion 168 having a groove 169 and a bore 167 which is essentially the same size as feed shaft 180. Thus it is seen all the components shown in FIG. 9 are adapted to be mounted on the drive flange 166 which in turn receives shaft 180. Also mounted on cam portion 168 of drive flange 166 are spring part 170 and driving stud 171. Hub portion 163 has an annular groove 164 therein adapted to receive a retaining washer. The end portion of hub 163 is provided with a transverse bore 165 adapted to receive a locking pin 154. Locking pin 154 is press fitted within bore 165 and passes therethrough. Located in feed shaft 180, as shown in FIG. 1, are a series of transverse bores such as 181. The drive flange 166 is adapted to be moved along shaft 180 when locking pin 154 is removed. A plurality of transverse bores such as 181 are provided in feed shaft 180 so that the drive flange may be locked to shaft 180 in various positions. This adjustment feature accommodates the various center distances of axial lead components.

A driving link 159 having curved portions 160, 158 and 155 has an enlarged portion 156 and bore 157 therein which is adapted to be locked under driving stud 171. The opposite portion of the driving link is an enlarged portion 161 having a bore 162 therein which is adapted to receive a bolt such as 217 aS shown in FIG. 1 which locks the other end of the driving link to the portion 132 of the feeder blade 131. Portion 132 of feeder blade 131 has a bore 133 adapted to receive bolt 217.

Feeder blade 31 is adapted to ride between feed guides 115 and 141 and on its rear face has a bevelled portion 130 and scalloped lead engaging teeth 129. The lower portion of feeder blade 131 is tapered as at 134 to provide a narrow depending portion 135 terminating in bevelled portion 136. The interrelationship of the feed guide and feeder blade together with the driving link and driving flange are shown in FIG. 6.

Shaft 180 is adapted to be reciprocally driven, which in turn causes the feeder blade through the connection to the drive flange by driving link 159 to vertically reciprocate.

Dog 101 is pivotally secured to feed guide 115 by post 112 and is adapted to retain the taped axial components in place. The pivotal point securement of the dog allows it to accommodate the movement of the tape and to pivot upon advancement of the taped components. The taped components, as stated, are advanced by the downward stroke of feeder blade 131 caused by the reciprocal action of drive flange 166. On the upward stroke of feeder blade 131 the scalloped teeth 129 are adapted to ride over the leads which are held in position from moving upwardly by the scalloped teeth 105 on dog 101. However, on the downward stroke ofthe feeder blade 131 the lower portion of dog 101 pivots slightly outwardly to allow the leads to ride on the scalloped teeth to move from one tooth to another.

As shown in FIG. 1, the lead advance mechanism 100 is mounted in front of slot 75 of rear plate 71 and the tape is adapted to ride down the right hand edge of guide 76. A mirror image advancement mechanism 300 contains feed guides 301 and 302, spring 302 bushing 306 and driving flange 308. Springs such as 216 and 313 are adapted to have one end fastened within hole such as 140 of projecting portion 139 and are used to insure reciprocal movement of the guiding flange 166 by shaft 180. The upper end of spring 216 is adapted to hook into hole 101' of dog 101. This spring thus biases the dog 101 in a clockwise direction to insure the teeth 105 are in constant engagement with the leads of the tape components as they are fed through the mechanism. The spring 216 also insures a positive reciprocal motion of drive flange 166 and shaft 180.

To further insure positive reciprocal action of drive flange 166 a torsion spring 214 having a coiled portion 213 is adapted to be mounted onto stud 170 of drive flange 166. A nut 213'' and washer 213' are adapted to maintain the spring on stud 171. The upper end of spring 214 is bent as at 215 to engage the outer side of link 159, thereby biasing the drive flange 166 and link 155 in a counterclockwise direction.

Figure 8:
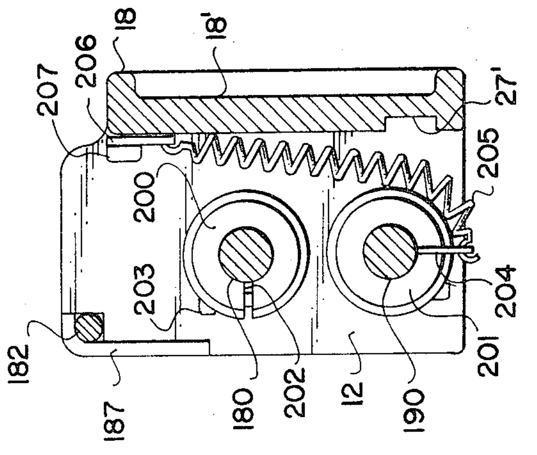
FIG. 8 is a cross sectional view of the apparatus shown in FIG. 1 taken along line 8—8 and in the direction of the arrows indicated.
Figure 7:
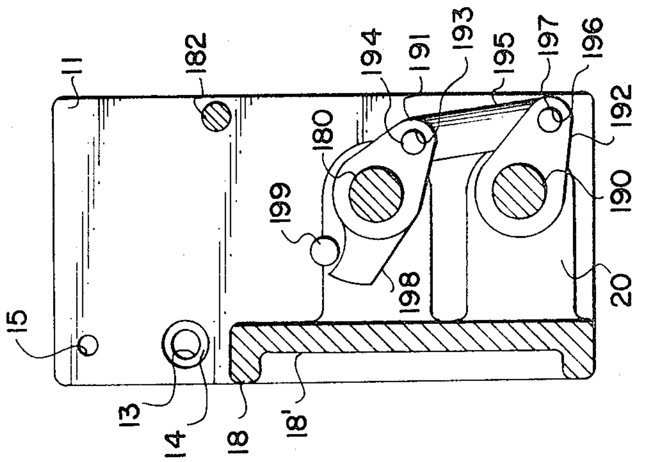
FIG. 7 is a cross section of the apparatus shown in FIG. 1 taken along line 7—7 thereof.

Looking at FIG. 1 it is seen that guide 76 is secured to rear plate 71 by a machine screw 76'. Mounted on web 18 is a second rear plate 309 and guide 310 secured thereto by a machine screw 310'. Rear plate 309 has a slot 301. The corresponding advancement mechanism 300 contains a link 304, torsion spring 305 and a drive flange 308. Feeder shaft 180 extends through the advancement mechanisms 100 and 300 and has a knurled bushing 200 thereon which is split as at 202 to accommodate a machine screw 203 to lock it in place on shaft 180 as shown in FIG. 8. A cutter shaft 190 extends between end portions 11 and 12 and has a knurled bushing 201 thereon secured thereto by a machine screw 208. The split portion of knurled bushing 201 has a bracket 204 to which is attached a helical spring 205. The opposite end of spring 205 is engaged in a spring hanger 206 secured to web 18 by machine screw 207. A bar 182 has one end engaged in hole 16' of end portion 11 of the support frame and the other end secured in place by a bracket 187 held in place on end portion 12 by machine screws 188 and 189. Bar 182 is adapted to pass under the over hang of feeder blade 131 and dog 102. The shaft 182 is bent as at 185 provide a handle portion 186. A stop 183' is located thereon against which a compression spring 184 acts to keep the opposite end of the shaft engaged in hole 16' within portion 11. The end of cutter shaft 190 has a cap 209 thereon and also has a pair of cutters 211 and 311 as shown in FIG. 1 mounted thereon. The cutters are identical and the configuration is shown in FIG. 6. The outer periphery of cutter 211 is smooth as at 210 and is broken by a notched area of reduced diameter 212. As shown in FIG. 6, the leads are adapted to pass down between the feed guide 141 and rear plate 71 until they engage on sloped portion 56 of die 50. As they ride along sloped portion 56 between the rearwardly curved portion 147 of feed guide 141, they are forced outwardly from web 18 until the cutter 211 is reciprocated thus bringing cutting portion 212 down to cut the end of the lead off. Cutter portion 212 acts in conjunction with notch 60 and die 50 to sever the tape portion of the lead from the main body of the component. The cutter shaft receives its reciprocal motion from a link 195 having studs 194 and 197 thereon. Stud 194 is received within an aperture 193 of a driving arm 191 which is fixedly secured to feed shaft 180. The opposite end of driving arm 191 has a projection 198 adapted to engage a stop 199 on the housing. This is shown in both FIGS. 1 and 7; the opposite end of driving link 195 has projection stud 197 received in an aperture 196 of a driving arm 192 fixedly secured to cutter shaft 190. Thus shaft 180 is the only powered shaft and shaft 190 receives its reciprocal motion directly through driving arm 195 from shaft 180.

Thus it is that as the taped axially lead components are fed down, the outer edges of the tapes reside against the inner edges of guides 76 and 310. The width of the tape is less than the distance between the inner edge of the guides and the outer edge of the feed guides such as 141 and 303. The tape is fed downwardly through the reciprocal action of feeder blade 131 on its downward stroke but maintained in place through the biased pivotal action of dog 101 while feeder blade 131 is on its upward stroke. As the taped components continue downwardly the leads are pushed outwardly on slope surface 56 until such time as they reside in notch 60 whereupon, on the reciprocal stroke of shaft 180, cutters 211 and 311 are forced counterclockwise downwardly thereby severing the taped portion of the lead on either side of the component. The cut tape portions continue downwardly as the cycle continues through tapered groove 63 and then outwardly from the apparatus.

Thus it is seen that a positive advance and lead severing mechanism has been provided and that the apparatus as shown can accommodate various lengths of leads and can be adjusted therefore. The adjustment is accomplished simply by moving driving flange such as 166 on shaft 180. Cutters 211 and 311, which are splined to rotate with shaft 190 are able to slide therealong by removing pins, not shown, similar to 154 on shaft 180. After cutters 211 and 311 are in place the outer faces thereof engage the outer surfaces of such flanges as 53 of die 50. The guides likewise can be moved in relation to the rear plates by the adjustment provided by the slots such as 31 and 32 in web 18 and the slots 78 and 79 in guide 76. The feed mechanism 100 is first moved to a position desired whereupon machine screws 76' and 310' are loosened and guides are adjusted. With cutters 211 and 311 adjusted by removing and replacing their holding pins at appropriate spacing, dies 50 are adjusted by loosening the machine screws such as the one shown in FIG. 6 and moving the dies until they engage the face of the cutters.

While only one embodiment of the invention mentioned has been shown and described, many changes and modifications will become obvious to those of ordinary skill in the art and can be made without departing from the scope of the appended claims.

In the claims:

1. An axial lead component dispensing apparatus, said apparatus comprising a support means, a feed shaft on said support means, guide means on said feed shaft adapted to receive a length of taped axial lead components, advancement means adapted to sequentially advance said length of components, lead severing means adapted to sever the taped portions of said leads from the remainder thereof, said guide means, advancement means and lead severing means being laterally adjustable on said support means whereby said apparatus can accommodate various length component leads.

2. An apparatus as in claim 1 wherein said apparatus further includes component dispensing means.

3. An apparatus as in claim 2 wherein said guide means includes a pair of laterally adjustable guide plates mounted on said support means.

4. An apparatus as in claim 3 wherein said guide means additionally includes a pair of members adjustably mounted on said feed shaft, said members together with said plates and support means forming passages for the downward advancement of said taped components.

5. An apparatus as in claim 4 wherein said advancement means comprises toothed lead advancing members and toothed lead holding members, all of said toothed members being adjustably mounted on said feed shaft, an eccentric means connecting said feed shaft and said toothed lead advancing members and adapted to convert rotary reciprocal movement of said feed shaft to vertical reciprocal movement of said lead advancing members, the teeth of said lead advancing means adapted to engage said leads and advance said length of components and the teeth of said holding members adapted to maintain said length of components in place during upward strokes of said advancement members.

6. An apparatus as in claim 5 wherein said lead severing means includes a cutter shaft mounted for reciprocal rotative movement on said support means, an eccentric connecting said feed shaft with said cutter shaft, a pair of rotary cutters mounted on said cutter shaft and adapted to reciprocally sever the leads.

7. An apparatus as in claim 6 wherein said feed shaft has locating means spaced therealong and said lead advancing and holding members have means thereon adapted to be selectively engaged in said locating means to vary the size leads the apparatus may accommodate.

* * * * *